(12) United States Patent
Caprai

(10) Patent No.: US 6,251,015 B1
(45) Date of Patent: Jun. 26, 2001

(54) GAME UNIT CONTROLLER WITH HANDLEBARS

(75) Inventor: John R. Caprai, Meridian, ID (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 09/280,388

(22) Filed: Mar. 29, 1999

(51) Int. Cl.[7] ........................................... A63F 9/22
(52) U.S. Cl. .................. 463/36; 463/37; 273/148 B; 273/440; 273/442; 434/61
(58) Field of Search .......................... 463/36–39, 58–69, 463/6; 434/61, 62–71; 273/440, 442, 148 B

(56) References Cited

U.S. PATENT DOCUMENTS

| | | | |
|---|---|---|---|
| 4,978,300 | * 12/1990 | Letovsky et al. | 434/61 |
| 5,125,843 | * 6/1992 | Holloway | 434/61 |
| 5,240,417 | * 8/1993 | Smithson et al. | 434/61 |
| 5,364,271 | * 11/1994 | Aknin et al. | 434/61 |
| 5,547,382 | * 8/1996 | Yamasaki et al. | 434/61 |

* cited by examiner

Primary Examiner—Jessica J. Harrison
Assistant Examiner—Sheila Clayton
(74) Attorney, Agent, or Firm—Park, Vaughan & Fleming LLP

(57) ABSTRACT

One embodiment of the present invention provides a game unit controller for controlling a game unit in a manner that simulates the feel of a bicycle, scooter, motorcycle, all-terrain vehicle, snowmobile, jet ski, or the like. The game unit controller includes a base with a clamp coupled thereto for securing the base to a peripheral edge of a table. Also included is a pivoting unit movably coupled to the base for generating control signals upon movement thereof. A handlebar assembly is coupled to the pivoting unit for being gripped by a user and moving the pivoting unit, thereby effecting the generation of the control signals which in turn control the associated game unit.

23 Claims, 5 Drawing Sheets

GAME UNIT CONTROLLER WITH HANDLEBARS

BACKGROUND

1. Field of the Invention

One embodiment of the present invention relates to steering wheel, paddle and joystick-type game unit controllers and more particularly pertains to a new game unit controller with handlebars for controlling a game unit in a manner that simulates the feel of a bicycle, scooter, motorcycle, all-terrain vehicle, snowmobile, jet ski, or the like.

2. Related Art

Many input devices have been developed for controlling game units and/or computer systems. For example, steering wheel, paddle, and joystick-type game unit controllers are commonly used to simulate the feel of automobiles, aircraft, and watercraft.

In these respects, the game unit controller with handlebars according to one embodiment of the present invention substantially departs from the conventional concepts and designs of the prior art, and in so doing provides an apparatus primarily developed for the purpose of controlling a game unit in a manner that simulates the feel of a bicycle, scooter, motorcycle, all-terrain vehicle, snowmobile, jet ski, or the like.

SUMMARY

In view of the foregoing disadvantages inherent in the known types of steering wheel, paddle and joystick-type game unit controllers one embodiment of the present invention provides a new game unit controller with handlebars construction wherein the same can be utilized for controlling a game unit in a manner that simulates the feel of a bicycle, scooter, motorcycle, all-terrain vehicle, snowmobile, jet ski, or the like.

To attain this, one embodiment of the present invention provides a game unit controller with a base having a planar bottom face and a bulbous top face. A socket is formed in the top face of the base for reasons that will soon become apparent. Also included is a clamp that has a top end fixedly coupled to the bottom face of the base, a free bottom end, and a lever. The lever is configured for selectively urging the bottom end of the clamp towards the bottom face of the base. By this structure, the clamp serves for receiving a peripheral edge of a table. As such, the bottom face of the base rests on a top surface of the table and the bottom end of the clamp engages a bottom surface of the table. The base is thus adapted to be fixed with respect to the table during use. Next provided is a pivoting unit including a ball pivotally received in the socket of the base. Associated therewith is a post fixedly coupled to the ball and extending therefrom in a vertical direction.

In use, the game unit controller is connected to a game unit and adapted for transmitting a first down pitch control signal to the game unit upon urging the post in a forward direction, transmitting a second down pitch control signal to the game unit upon urging the post in a rearward direction, transmitting a leftward control signal to the game unit upon urging the post in a leftward direction, and transmitting a rightward control signal to the game unit upon urging the post in a rightward direction.

For simulating the feel of a bicycle, scooter, motorcycle, all-terrain vehicle, snowmobile, jet ski, or the like, a handlebar assembly is provided. The handlebar assembly includes a central portion fixedly coupled at a midpoint thereof to a top end of the post of the pivoting unit in perpendicular relationship therewith. Integrally coupled to ends of the central portion is a pair of side portions that reside in a single common plane which is situated above and in parallel with the central portion of the handlebar assembly. Mounted on the handlebar assembly is a pair of hand grips. The hand grips include a fixed hand grip and a throttle hand grip with the throttle hand grip being rotatably coupled to the corresponding side portion of the handlebar assembly. Each hand grip includes a cylindrical outboard extent coupled to an end of one of the side portions of the handlebar assembly. For maintaining hands of a user on the hand grips, an annular inboard extent is coupled to an inboard end of the outboard extent of each hand grip.

In operation, the game unit controller is adapted for transmitting an acceleration control signal to the game unit upon rotation of the throttle hand grip. Further provided is a throttle thumb lever having an inboard end pivotally coupled about a vertical axis to one of the side portions of the handlebar assembly. The throttle thumb lever is ideally situated adjacent to the throttle hand grip such that the throttle thumb lever resides below the same. Upon depression of the throttle thumb lever, the game unit controller serves for transmitting the acceleration control signal to the game unit. A brake hand lever has an inboard end pivotally coupled to one of the side portions of the handlebar assembly adjacent to the throttle hand grip. The brake hand lever ideally resides below the throttle hand grip. In operation, the game unit controller is adapted for transmitting a brake control signal to the game unit upon depression of the brake hand lever.

Similar to the brake hand lever, an upshift hand lever has an inboard end pivotally coupled to one of the side portions of the handlebar assembly. The upshift hand lever, however, is positioned adjacent to the fixed hand grip such that the upshift hand lever resides below the fixed hand grip. The game unit controller is adapted for transmitting an upshift control signal to the game unit upon depression of the upshift hand lever.

Finally, a downshift thumb lever has an inboard end pivotally coupled about a vertical axis to one of the side portions of the handlebar assembly. The downshift thumb lever is ideally situated adjacent to the fixed hand grip such that the downshift thumb lever resides below the same. Upon depression of the downshift thumb lever, the game unit controller serves for transmitting a downshift control signal to the game unit.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

One embodiment of the present invention, designated as numeral 10, includes a game unit controller 12 for use with a game unit 14 adapted for reacting to various control signals. The game unit 14 may take the form of a dedicated game unit in combination with a television or a computer in combination with an associated monitor. Alternatively, the game unit 14 may be a general purpose computer. In operation, the game unit is adapted to depict on the associated display a visual simulation of a person riding a bicycle, scooter, motorcycle, all-terrain vehicle, snowmobile, jet ski, or the like. During the course of play, the visual simulation, or representation, is changed in response to control signals to simulate movement in various directions, acceleration, braking, and shifting of gears.

Figure 5:
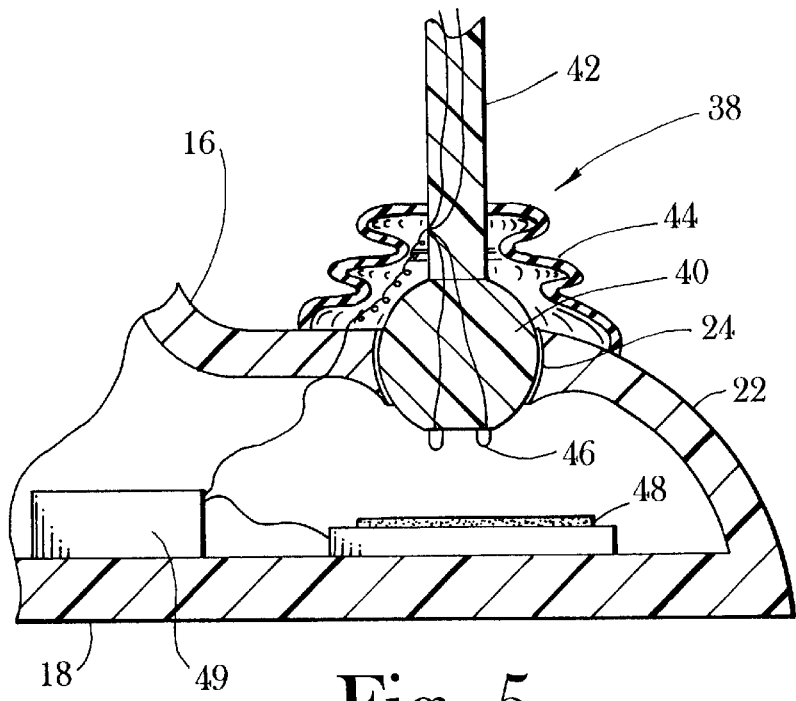
FIG. 5 is a side cross-sectional view of the base of one embodiment of the present invention showing the pivoting unit.

The game unit controller 12 first includes a base 16 having a planar bottom face 18 and a bulbous top face 20 which is representative of a gas tank. A gas tank cover 21 is mounted on an apex of the top face 20 of the base 16 to further characterize a gas tank of a motorcycle, scooter, all-terrain vehicle, snowmobile, jet ski, or the like. It should be noted that in an embodiment wherein a bicycle is imitated, the gas tank may be excluded in favor of a bar or the like. A front end of the top face of the base includes a forwardly extending mount 22 which has a height less than one-third a height of the apex of the top face of the base 16. For reasons that will soon become apparent, a socket 24 is formed in such forwardly extending mount 22, as shown in FIG. 5.

Figure 1:
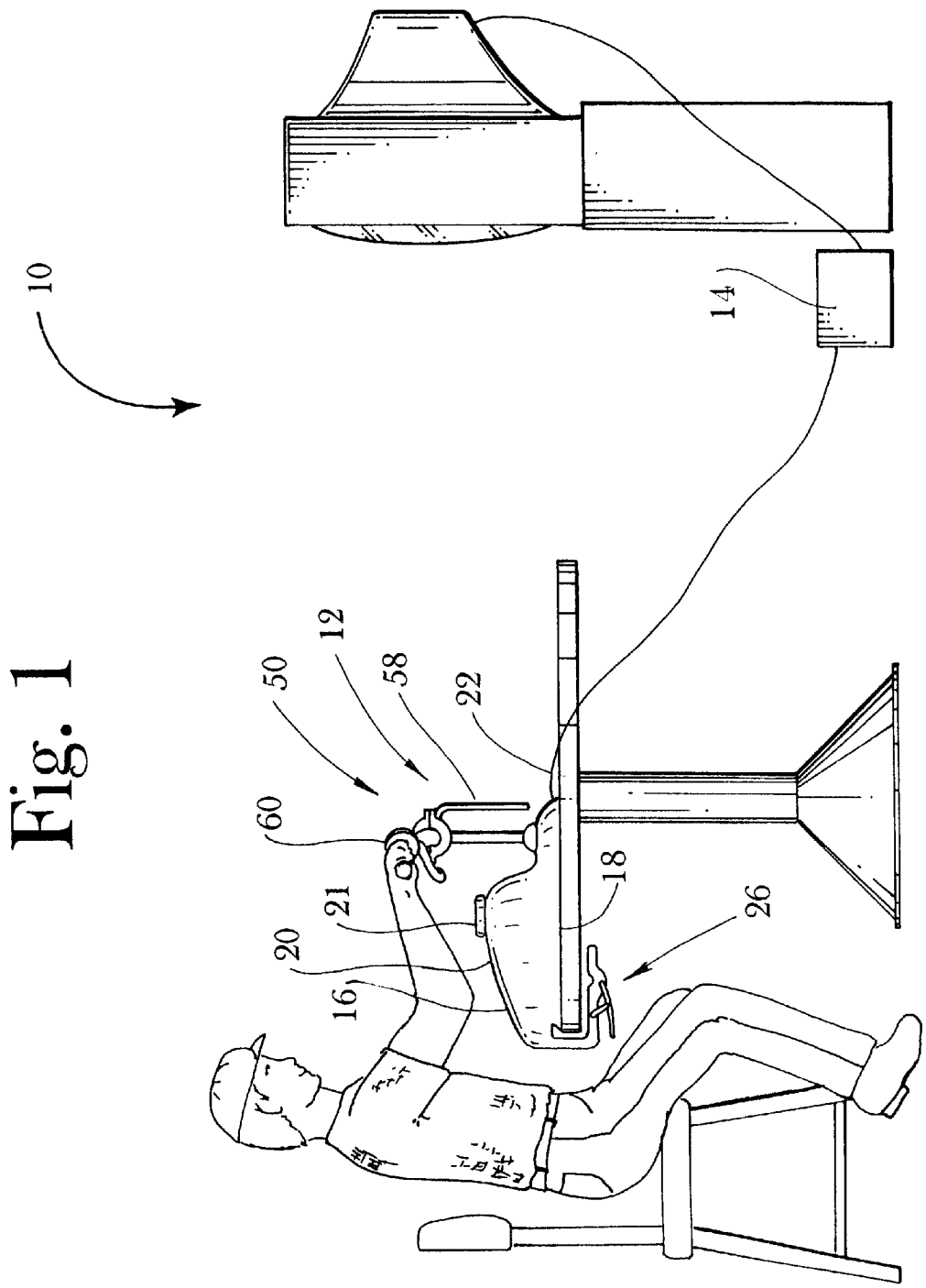
FIG. 1 is a side view of the game unit controller of one embodiment of the present invention in use.
Figure 2:
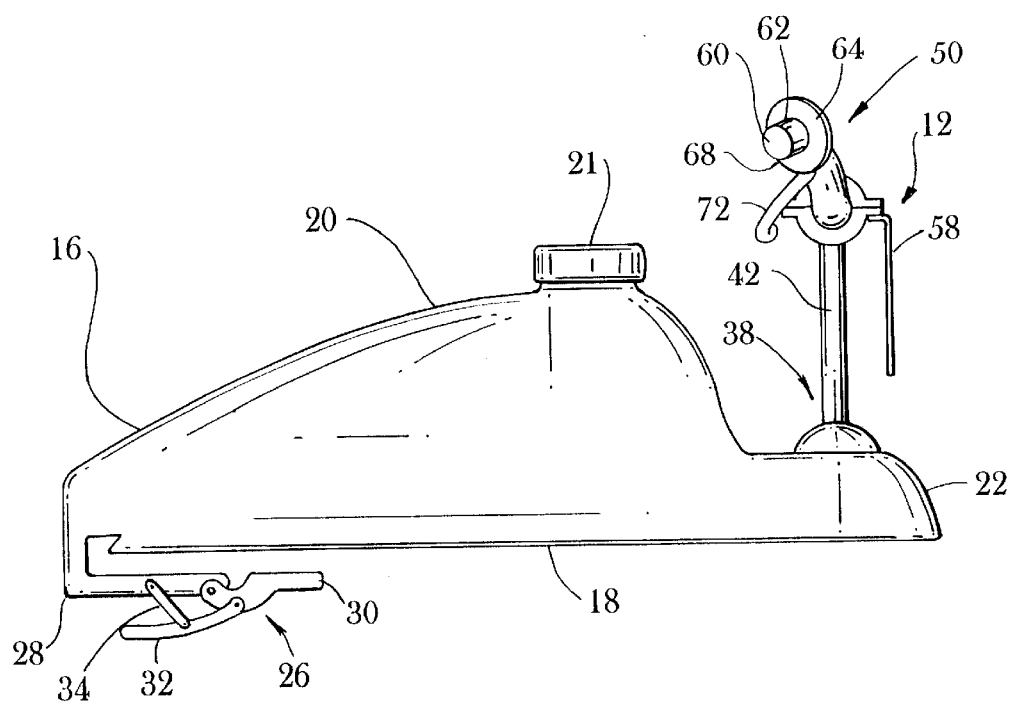
FIG. 2 is a detailed side view of the game unit controller in accordance with an embodiment of the present invention.
Figure 6:
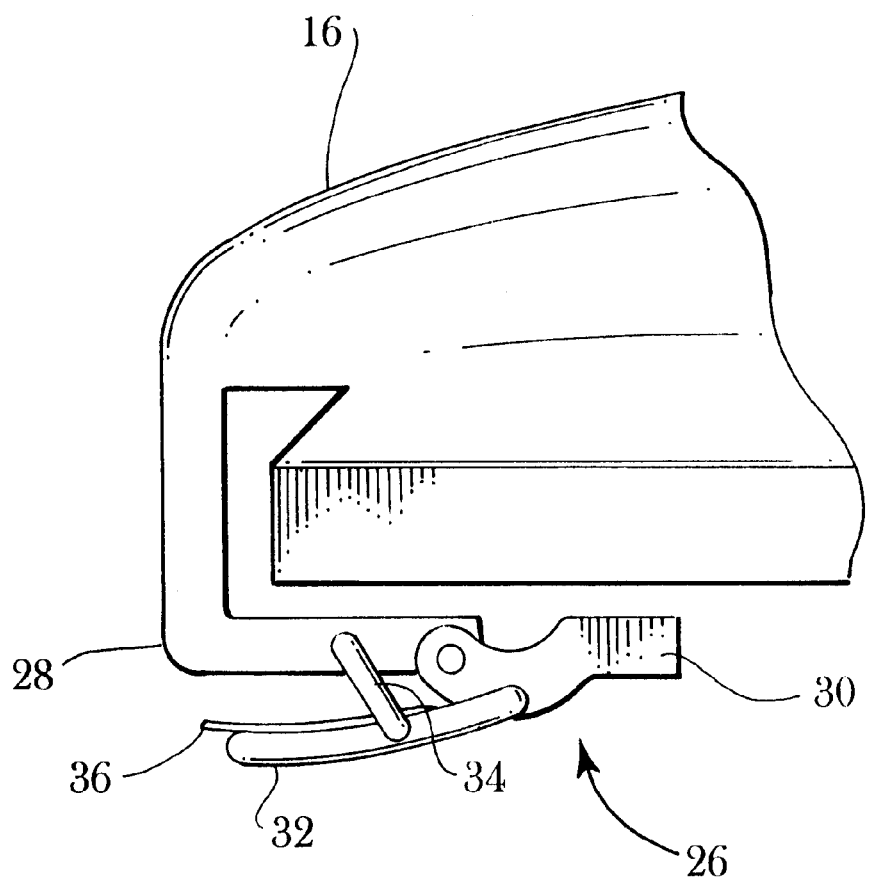
FIG. 6 is a detailed illustration of the clamp of the game unit controller in accordance with an embodiment of the present invention.

FIG. 6 shows a clamp 26 that includes a top end fixedly coupled to the bottom face 18 of the base 16, a free bottom end, and a lever 32. The lever 32 is configured for selectively urging the bottom end of the clamp 26 towards the bottom face 18 of the base 16. By this structure, the clamp 26 serves for receiving a peripheral edge of a table such that the bottom face 18 of the base 16 rests on a top surface of the table and the bottom end of the clamp 26 engages a bottom surface of the table. As shown in FIG. 1, the base 16 may thus be fixed with respect to the table during operation.

To accomplish this, the clamp 26 may include a fixed L-shaped leg 28 mounted to a rear end of the base 16 and extending below the bottom face 18 of the base 16. Pivotally coupled to a lower end of the L-shaped leg 28 is an engagement member 30. FIG. 6 shows a lever 32 with an inboard end pivotally coupled to the engagement member 30. For urging the engagement member 30 upwardly upon depression of the lever 32 toward the bottom face 18 of the base 16, an interconnect 34 is pivotally coupled between a central extent of the lever 32 and the L-shaped leg 28. It should be noted that upon the lever 32 being raised beyond a predetermined level, leverage action takes place between the foregoing components to maintain the engagement member 30 in a raised orientation. As an option, the lever 32 may be equipped with a release tab 36 for releasing the engagement member 30 from the raised orientation. The clamp 26 thus works in a manner similar to that of conventional vise-grip type wrenches and the like. In various alternate embodiments, the foregoing clamp 26 may be excluded in favor of any type of couple including, but not limited to suction cups, elastomeric pads, a conventional vise, or any other type of mechanism which is capable of coupling the base 16 to a recipient surface.

Next provided is a pivoting unit 38 including a ball 40 pivotally received in the socket 24 of the base 16. See FIG. 5. Associated therewith is a post 42 fixedly coupled to the ball 40 and extending therefrom in a vertical direction. The post 42 extends upwardly beyond the apex of the top face 20 of the base 16. As an option, a resilient bellowed housing 44 may be attached between the post 42 of the pivoting unit 38 and the forwardly extending mount 22 of the base 16 for encompassing the ball 40 of the pivoting unit 38 and further urging the same into a neutral, unbiased vertical orientation. In use, the game unit controller 12 is connected to the game unit 14 and adapted for transmitting a first down pitch control signal to the game unit 14 upon urging the post 42 in a forward direction, transmitting a second down pitch control signal to the game unit 14 upon urging the post 42 in a rearward direction, transmitting a leftward control signal to the game unit 14 upon urging the post 42 in a leftward direction, and transmitting a rightward control signal to the game unit 14 upon urging the post 42 in a rightward direction. It should be understood that each time the post 42 of the pivoting unit 38 is moved in the manner set forth hereinabove, it is done so in a distinct vertical plane.

Figure 7:
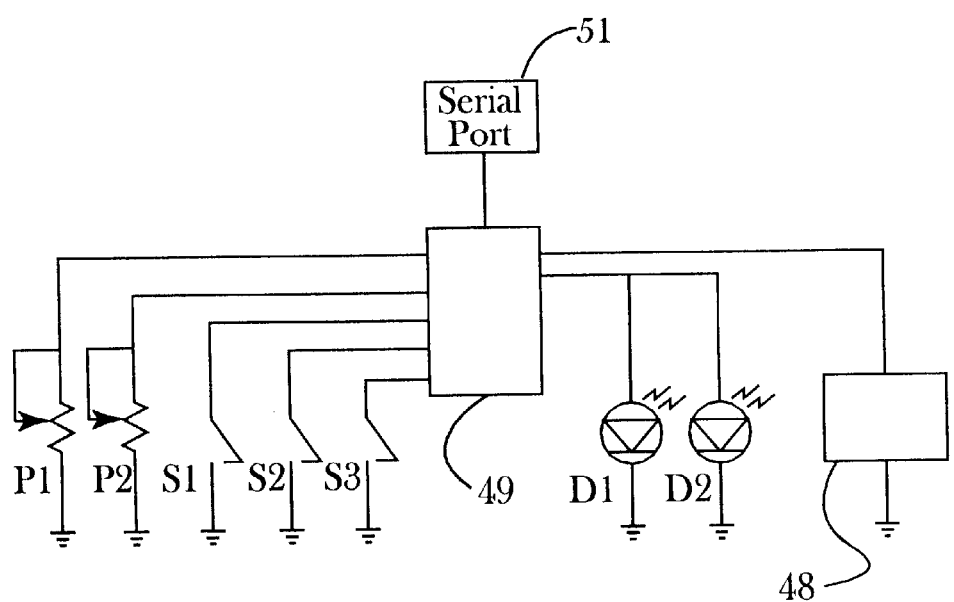
FIG. 7 is a schematic diagram in accordance with an embodiment of the present invention.

To effect the foregoing operation, a bottom of the ball 40 of the pivoting unit 38 may be equipped with a pair of infrared light emitting diodes 46 which are adapted to move coincidentally therewith. As shown in FIG. 7, the light emitting diodes 46 include at least two diodes, D1 and D2. Mounted in a hollow interior space of the forwardly extending mount 22 of the base 16 is an electro-optic board 48 that is spaced below the ball 40 of the pivoting unit 38 and the light emitting diodes 46. Note FIG. 5. The pitch forward down, pitch backward down, leftward, and rightward control signals and any combination thereof are generated upon the detection of a change of voltage from the electro-optic board 48 which results from the light emitting diodes 46 being moved with respect thereto. This detection may be carried out by control circuitry 49 which is in turn connected to the game unit via a serial port for transmitting the control signals thereto. Such combination of light emitting diodes and an electro-optic board is currently manufactured by Mitsumi TM and is employed in joysticks for the purpose of generating control signals. In the alternative, any type of movement detection mechanism may be utilized for generating control signals in response to the movement of the post 42 of the pivoting unit 38. In further alternate embodiments, the handlebar assembly and the pivoting unit 38 may pivot about a vertical axis for generating the leftward and rightward control signals upon rotation of the handlebar assembly in a counterclockwise and a clockwise direction, respectively.

Figure 3:
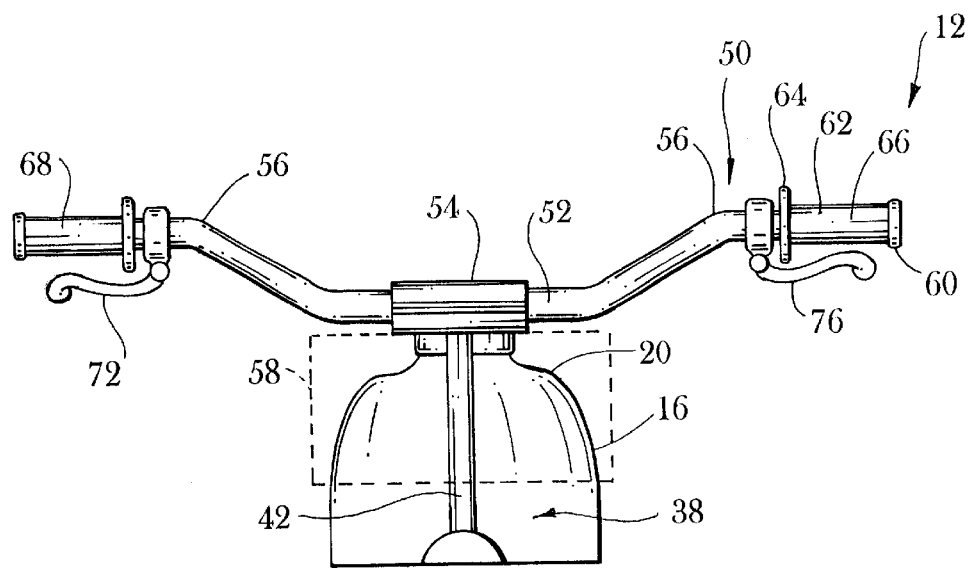
FIG. 3 is a front view of the game unit controller in accordance with an embodiment of the present invention.
Figure 4:
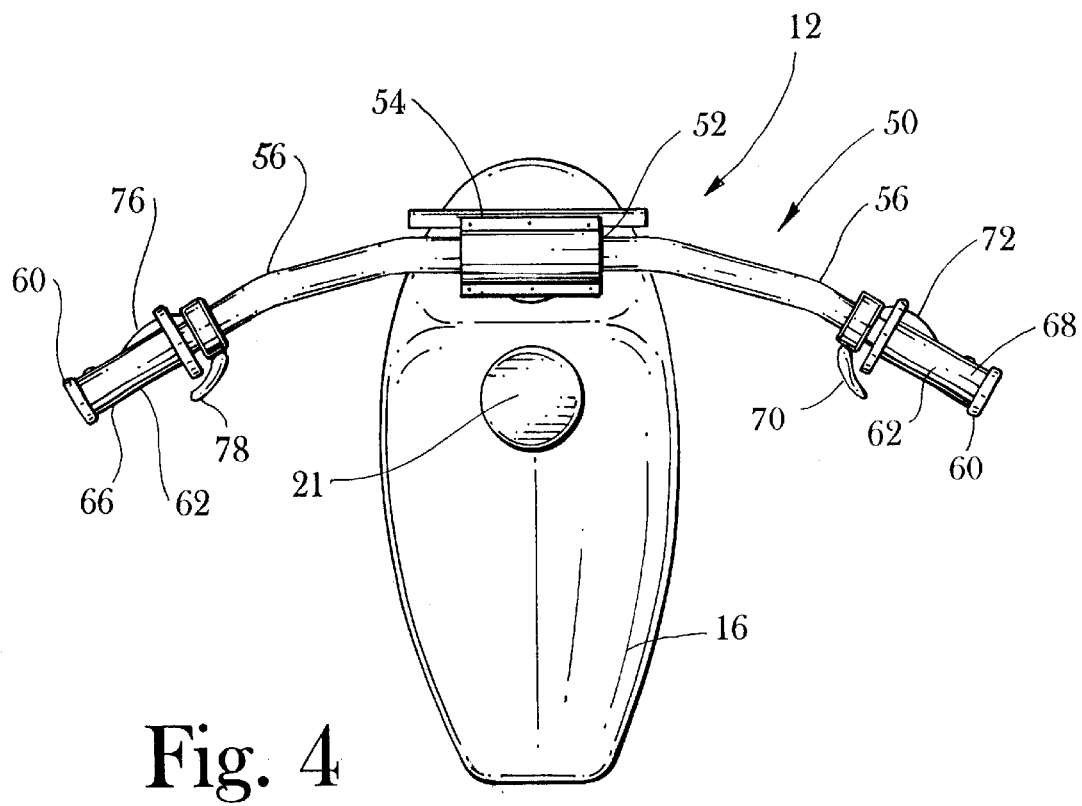
FIG. 4 is a top view of the game unit controller in accordance with an embodiment of the present invention.

For simulating the feel of a bicycle, scooter, motorcycle, all-terrain vehicle, snowmobile, jet ski, or the like, a handlebar assembly 50 is provided. The handlebar assembly 50 includes a central portion 52 fixedly coupled at a midpoint thereof to a top end of the post of the pivoting unit 38 in perpendicular relationship therewith. Ideally, an elongated bracket 54 is provided including a bottom half fixedly coupled to the post 42 of the pivoting unit 38 and a top half removably attached to the bottom half for securing the central portion 52 of the handlebar assembly 50 therebetween. Integrally coupled to ends of the central portion 52 is a pair of laterally extending side portions 56 that reside in a single horizontal plane which is situated above and in parallel with the central portion 52 of the handlebar assembly 50. The side portions may be slightly angled rearwardly, as can be seen in FIG. 4. As shown in FIGS. 1 & 3, a number plate 58 may be coupled to the handlebar assembly 50 such that the same depends downwardly therefrom.

Mounted on the handlebar assembly is a pair of hand grips 60. The hand grips 60 include a fixed hand grip 66 and a throttle hand grip 68 being rotatably coupled to the corresponding side portion of the handlebar assembly 50. Each hand grip includes a cylindrical outboard extent 62 coupled to an end of one of the side portions 56 of the handlebar assembly 50. For maintaining hands of a user on the hand grips 60, an annular inboard extent 64 is coupled to an inboard end of the outboard extent 62 of each hand grip. In operation, the game unit controller 12 is adapted for transmitting an acceleration control signal to the game unit 14 upon rotation of the throttle hand grip 68. This may be accomplished by way of a potentiometer P1 mounted between the throttle hand grip 68 and the corresponding side portion of the handlebar assembly 50. As shown in FIG. 7, the potentiometer P1 is connected to the control circuitry 49 for transmission of the acceleration control signal to the game unit 14.

Further provided is a throttle thumb lever 70 having an inboard end pivotally coupled about a vertical axis to one of the side portions 56 of the handlebar assembly 50. The throttle thumb lever 32 is ideally situated adjacent to the throttle hand grip 68 such that the throttle thumb lever 70 resides below the same. Upon depression of the throttle thumb lever 70, the game unit controller serves for transmitting the acceleration control signal to the game unit 14. As such, either the throttle thumb lever or the throttle hand grip may be employed for the purpose of effecting the transmission of the acceleration control signal. Similar to the throttle hand grip 68, the throttle thumb lever 70 is equipped with a potentiometer P2 connected to the control circuitry 49 for generation of the acceleration control signal that is in turn relayed to the game unit.

A brake hand lever 72 has an inboard end pivotally coupled to one of the side portions 56 of the handlebar assembly 50 adjacent to the throttle hand grip 68. The brake hand lever 72 may reside in front of and below the throttle hand grip 68. In operation, the game unit controller is adapted for transmitting a brake control signal to the game unit 14 upon depression of the brake hand lever 72.

Similar to the brake hand lever 72, an upshift hand lever 76 has an inboard end pivotally coupled to one of the side portions 56 of the handlebar assembly 50. The upshift hand lever 76, however, is positioned adjacent to the fixed hand grip 66 such that the upshift hand lever 76 resides in front of and below the fixed hand grip 66. As such, both the brake and upshift hand levers are angled downwardly and forwardly for optimum gripping. See FIGS. 3 & 4. In use, the game unit controller is adapted for transmitting an upshift control signal to the game unit 14 upon depression of the upshift hand lever 76.

Associated therewith is a downshift thumb lever 78 having an inboard end pivotally coupled about a vertical axis to one of the side portions 56 of the handlebar assembly 50. The downshift thumb lever 78 is ideally situated adjacent to the fixed hand grip 66 such that the downshift thumb lever 78 resides below the same. The thumb levers may each have a length which is a fraction of that of the brake and upshift hand levers. Upon depression of the downshift thumb lever 78, the game unit controller serves for transmitting a downshift control signal to the game unit 14.

As shown in FIG. 7, the brake hand lever, upshift hand lever, and downshift thumb lever are equipped with a switch, SW1, SW2, and SW3, respectively. Such switches are positioned between the associated lever and the handlebar assembly 50, or simply incorporated into the corresponding lever. As shown in FIG. 7, the switches are connected to the control circuitry 49 for generation of the corresponding control signal that is in turn relayed to the game unit. It should be noted that the control circuitry 49 serves to standardize the control signals and prepare the same for transmission to the game unit 14. In the alternative, however, the control circuitry may be excluded in favor of a direct connection between the various control signal generating components and the game unit. In such embodiment, the game unit may be equipped with a driver or the like for interpreting the control signals. In any embodiment, the game unit or game unit controller may be programmed to instruct the game unit to react to each of the control signals in any user-selected manner.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus comprising:
   a base;
   a pivoting unit movably coupled to the base for generating control signals upon movement thereof, wherein the pivoting unit includes a ball pivotally received in a socket formed in the base and a post fixedly coupled to the ball and extending therefrom in an upward direction for generating a first down pitch control signal upon urging the post in the forward direction, generating a second down pitch control signal upon urging the post in the rearward direction, generating a leftward control signal upon urging the post in the leftward direction, and generating a rightward control signal upon urging the post in the rightward direction;
   a handlebar assembly connected to the post of the pivoting unit for being gripped by a user and moving the pivoting unit, wherein the pivoting unit allows pivoting of the handlebar assembly in a forward direction, a rearward direction, a leftward direction, and a rightward direction; and
   a resilient bellowed housing attached between the post and a forwardly extending mount of the base, wherein the bellowed housing urges the pivoting unit into a neutral, unbiased vertical orientation.

2. The apparatus of claim 1, wherein the handlebar assembly includes a pair of laterally extending side portions.

3. The apparatus of claim 1, wherein the handlebar assembly includes a central portion fixedly coupled at a midpoint thereof to the pivoting unit and a pair of side portions coupled to ends of the central portion and residing thereabove.

4. The apparatus of claim 1, and further comprising a hand grip rotatably coupled to the handlebar assembly for generating a control signal upon rotation thereof.

5. The apparatus of claim 4, wherein the hand grip is a throttle hand grip and the control signal is an acceleration control signal.

6. The apparatus of claim 1, and further comprising a lever having an inboard end pivotally coupled to the handlebar assembly for generating a control signal upon depression thereof.

7. The apparatus of claim 6, wherein the lever is a brake hand lever and the control signal is a brake control signal.

8. The apparatus of claim 6, wherein the lever is an upshift hand lever and the control signal is an upshift control signal.

9. The apparatus of claim 6, wherein the lever is a throttle thumb lever and the control signal is a throttle control signal.

10. The apparatus of claim 6, wherein the lever is a downshift thumb lever and the control signal is a downshift control signal.

11. The apparatus of claim 1, wherein the base includes a couple mounted thereon for securing the base to a table.

12. An apparatus comprising:
    a base;
    a clamp coupled to the base for securing the base to a peripheral edge of a table;
    a pivoting unit movably coupled to the base for generating control signals upon movement thereof, wherein the pivoting unit includes a ball pivotally received in a socket formed in the base and a post fixedly coupled to the ball and extending therefrom in an upward direction for generating a first down pitch control signal upon urging the post in the forward direction, generating a second down pitch control signal upon urging the post in the rearward direction, generating a leftward control signal upon urging the post in the leftward direction, and generating a rightward control signal upon urging the post in the rightward direction;
    a gripping assembly coupled to the pivoting unit for being gripped by a user and moving the pivoting unit, wherein the pivoting unit allows pivoting of the gripping assembly in a forward direction, a rearward direction, a leftward direction, and a rightward direction; and
    a resilient bellowed housing attached between the post and a forwardly extending mount of the base, wherein the bellowed housing urges the pivoting unit into a neutral, unbiased vertical orientation.

13. The apparatus of claim 12, wherein the clamp includes an engagement member for being selectively moved toward a bottom face of the base.

14. The apparatus of claim 13, wherein the clamp further includes a lever for selectively urging the engagement member toward the bottom face of the base.

15. A method of generating control signals for transmission to a game unit for the purpose of simulating control of a vehicle, comprising:
    providing a handlebar assembly;
    gripping the handlebar assembly such that hands of a user are spaced and palms of the hands face downwardly;
    generating a first down pitch control signal upon urging the handlebar assembly in a forward direction;
    generating a second down pitch control signal upon urging the handlebar assembly in a rearward direction;
    generating a leftward control signal upon urging the handlebar assembly in a leftward direction; and
    generating a rightward control signal upon urging the handlebar assembly in a rightward direction.

16. The method of claim 15, further comprising:
    providing a hand grip rotatably coupled to the handlebar assembly; and
    generating a control signal upon rotation of the hand grip.

17. The method of claim 16, wherein the hand grip is a throttle hand grip and the control signal is an acceleration control signal.

18. The method of claim 15, further comprising:
    providing a lever pivotally coupled to the handlebar assembly; and
    generating a control signal upon depression of the lever.

19. The method of claim 18, wherein the lever is a throttle thumb lever and the control signal is an acceleration control signal.

20. The method of claim 18, wherein the lever is a brake hand lever and the control signal is a brake control signal.

21. The method of claim 18, wherein the lever is an upshift hand lever and the control signal is an upshift control signal.

22. The method of claim 18, wherein the lever is a downshift thumb lever and the control signal is a downshift control signal.

23. A game unit controller for use with a table having a top surface and a bottom surface with a peripheral edge therebetween and a game unit adapted for reacting to control signals, the game unit controller comprising:
    a base including a bottom face and a bulbous top face with a socket formed thereon;
    a clamp including a top end fixedly coupled to the bottom face of the base, a free bottom end, and a lever for selectively urging the bottom end of the clamp towards the bottom face of the base, wherein the clamp is adapted for receiving the peripheral edge of the table such that the bottom face of the base rests on the top surface of the table and the bottom end of the clamp engages the bottom surface of the table, thereby fixing the base with respect to the table;
    a pivoting unit including a ball pivotally received in the socket of the base and a post fixedly coupled to the ball and extending therefrom in a vertical direction, wherein the game unit controller is adapted to be connected to the game unit for transmitting a first down pitch control signal to the game unit upon urging the post in a forward direction, transmitting a second down pitch control signal to the game unit upon urging the post in a rearward direction, transmitting a leftward control signal to the game unit upon urging the post in a leftward direction, and transmitting a rightward control signal to the game unit upon urging the post in a rightward direction;
    a resilient bellowed housing attached between the post and a forwardly extending mount of the base, wherein the bellowed housing urges the pivoting unit into a neutral, unbiased vertical orientation;
    a handlebar assembly including a central portion fixedly coupled at a midpoint thereof to a top end of the post of the pivoting unit in perpendicular relationship therewith and a pair of side portions integrally coupled to ends of the central portion and residing in a single common plane which is situated above and in parallel with the central portion of the handlebar assembly;
    a pair of hand grips each including a cylindrical outboard extent coupled to an end of one of the side portions of the handlebar assembly and an annular inboard extent coupled to an inboard end of the outboard extent, the hand grips including a fixed hand grip and a throttle hand grip being rotatably coupled to the corresponding side portion of the handlebar assembly, wherein the game unit controller is adapted for transmitting an acceleration control signal to the game unit upon rotation of the throttle hand grip;

a throttle thumb lever having an inboard end pivotally coupled to one of the side portions of the handlebar assembly adjacent to the throttle hand grip such that the throttle thumb lever resides below the throttle hand grip, wherein the game unit controller is adapted for transmitting the acceleration control signal to the game unit upon depression of the throttle thumb lever;

a brake hand lever having an inboard end pivotally coupled to one of the side portions of the handlebar assembly adjacent to the throttle hand grip such that the brake hand lever resides below the throttle hand grip, wherein the game unit controller is adapted for transmitting a brake control signal to the game unit upon depression of the brake hand lever;

an upshift hand lever having an inboard end pivotally coupled to one of the side portions of the handlebar assembly adjacent to the fixed hand grip such that the upshift hand lever resides below the fixed hand grip, wherein the game unit controller is adapted for transmitting an upshift control signal to the game unit upon depression of the upshift hand lever; and a downshift thumb lever having an inboard end pivotally coupled to one of the side portions of the handlebar assembly adjacent to the fixed hand grip such that the downshift thumb lever resides below the fixed hand grip, wherein the game unit controller is adapted for transmitting a downshift control signal to the game unit upon depression of the downshift thumb lever.

* * * * *